United States Patent
O'Dell, III (10) Patent No.: US 7,970,118 B2
(45) Date of Patent: Jun. 28, 2011

(54) USER-DEFINED PRIORITY CALL ROUTER

(75) Inventor: James E. O'Dell, III, Waxhaw, NC (US)

(73) Assignee: Accenture Global Services Limited, Dublin (IE)

( * ) Notice: Subject to any disclaimer, the term of this patent is extended or adjusted under 35 U.S.C. 154(b) by 1528 days.

(21) Appl. No.: 11/359,719

(22) Filed: Feb. 22, 2006

(65) Prior Publication Data

US 2007/0206769 A1    Sep. 6, 2007

(51) Int. Cl.
*H04M 7/00*    (2006.01)
(52) U.S. Cl. ............................ 379/265.02; 379/265.1
(58) Field of Classification Search ............ 379/265.02, 379/242, 265.1
See application file for complete search history.

(56) References Cited

U.S. PATENT DOCUMENTS

| | | | |
|---|---|---|---|
| 5,530,744 A | 6/1996 | Charalambous | |
| 5,590,188 A * | 12/1996 | Crockett | 379/265.02 |
| 5,633,924 A | 5/1997 | Kaish et al. | |
| 6,128,380 A | 10/2000 | Shaffer et al. | |
| 6,453,038 B1 | 9/2002 | McFarlane et al. | |
| 6,690,788 B1 | 2/2004 | Bauer et al. | |
| 6,704,410 B1 | 3/2004 | McFarlane et al. | |
| 6,724,884 B2 * | 4/2004 | Jensen et al. | 379/265.01 |
| 6,901,380 B1 | 5/2005 | Bremers | |
| 2002/0172347 A1 * | 11/2002 | Elsey | 379/221.01 |
| 2006/0123060 A1 | 6/2006 | Allen et al. | |

FOREIGN PATENT DOCUMENTS

| | | |
|---|---|---|
| EP | 0982915 | 3/2000 |
| EP | 1107556 | 6/2001 |
| GB | 2339643 | 2/2000 |
| WO | WO 99/00966 | 1/1999 |

OTHER PUBLICATIONS

Office Action issued by the EPO on Mar. 20, 2008 on Application No. 07250715.5-2414.
EPO Communication, Extended European Search Report dated May 24, 2007, for EPO App. No. 07250715.5 (8 pages).

* cited by examiner

*Primary Examiner* — Ahmad F Matar
*Assistant Examiner* — Jirapon Intavong
(74) *Attorney, Agent, or Firm* — Finnegan, Henderson, Farabow, Garrett & Dunner, LLP (57) ABSTRACT

A priority routing process is provided for routing calls received via a call routing system to a live call center agent. Routing is determined through collection of Automated Call Distribution ("ACD") real-time performance based data and subjective non-ACD data, normalization and weighting of the ACD and non-ACD data through application of certain algorithms resulting in a derived priority score for each call center, and selection of a call center based upon the highest priority score.

40 Claims, 5 Drawing Sheets

| | Parameter weightings for calltype : | DSL In-Service PC ⌄ | | | |
|---|---|---|---|---|---|
| PR# | Descripti | DSL In-Service PC | Maximum Value | Unit | Parameter Type |
| | | DSL Inward PC | | | |
| | | EDSL | | | |
| 1 | ASA | 50 | 120 | Minutes | Dynamic |
| 2 | AHT | 20 | 35 | Minutes | Dynamic |
| 3 | SL | 30 | 100 | Percentage | Dynamic |
| 4 | POSE | 0 | 100 | Percentage | Static |
| 5 | Cost Per Resolution | 0 | 40 | USDollars | Static |
| 6 | Call Volume Tracking | 0 | 100 | Percentage | Dynamic |
| | Total Weight: | 100 | | | |

*Sum of all the parameter weight should not exceed 100

[Update] [Reset]

USER-DEFINED PRIORITY CALL ROUTER

BACKGROUND OF THE INVENTION

1. Field of Invention

The present invention relates to the field of call routing systems, and more particularly prioritizing the routing of calls to call center agents.

2. Description of Related Art

Call routing systems are used by companies that maintain customer service centers to route customer calls among different service centers. These call routing systems interface with customers in several different ways, perhaps the oldest being an Interactive Voice Response ("IVR") system that allows a customer to use a telephone keypad or voice commands to receive self service access to information from a company's customer service center without assistance from a live company representative. As part of the IVR system, the customer is provided an option to speak with a live call center agent, and when such a request is made, it is necessary for the IVR system to route the pending call to a specific call center, which in turn distributes the routed call to a specific live customer service agent.

While an IVR system can provide significant cost savings to a company for providing basic information generally requested by its customers, questions or other complex information necessitating a customer to speak with a live agent requires separate call center facilities. To minimize costs, a company may outsource the administration and maintenance of these call center facilities, and, consequently, these services might be provided by several vendors. These relationships between the company and call center vendors might be governed by unique service agreements. Because of the existence of multiple vendors servicing a single company's customer service center it is necessary to route calls querying a live call center agent to an individual call center based on criteria that considers these unique service agreements.

To date, the prior art's solution to such call routing is using call routing software accessed by the IVR when a customer indicates through an appropriate command to speak with a live call center agent. Present software, including products marketed by Genesys, Cisco, and Avaya, establishes call routing through the collection and comparison of performance-based metrics for each call center. These performance-based metrics include service time per call, handling time per call, and average time to answer. The routing software collects such information, compares it for each call center, and then routes the call to the call center determined to be operating most effectively. Present software also includes reporting capabilities that detail information regarding the call delivery to the call center.

Such prior art relating to call routing that bases the routing decision only on real-time performance-based metrics is most useful for routing calls among a company's call centers that are all operated by the same vendor. Cost considerations are not at issue at the local call center level because costs can be addressed globally with the vendor. The limitations of the prior art become apparent when applied in a situation in which the call centers are operated by separate vendors. There, use of the prior art software still permits selection of a call center through use of performance-based metrics, but it does not account for routing among different vendors using criteria based upon the agreements between the company and call center vendors in addition to performance-based metrics. An improvement of the prior art would provide for a routing function among several call centers, operated by separate vendors, for a customer call based on both performance-based and subjective criteria. A further improvement for routing a call based upon subjective criteria would be consideration given to service agreement criteria defined in the service agreements between a call center vendor and the company employing the call routing system.

BRIEF SUMMARY OF THE INVENTION

According to one aspect of the invention, the invention determines to which call center a customer's call preferably should be routed, by receiving Automated Call Distribution ("ACD") data from a plurality of call centers and compiling non-ACD data. A routing request for routing a customer call is received from the call routing system. The routing module evaluates the ACD data and non-ACD data to select a target call center from the plurality of call centers that service the call routing system. A target call center is selected, based upon this evaluation, and a routing command is returned to the call routing system. The call routing system then forwards the call to the selected target call center.

According to another aspect of the invention, when the routing module evaluates each call center, the ACD and non-ACD data are normalized and multiplied by a priority weighting value designated by the user, the sum of such values compiled to be a call center's priority score. The priority scores of all call centers are compared, and the call center with the highest priority score is designated the target call center.

According to another aspect of the invention, ACD data weighting values, non-ACD data weighting values, and non-ACD data are entered and/or adjusted by the user of the router module at an interval as determined by the user.

DETAILED DESCRIPTION OF THE INVENTION

In the following detailed description of the preferred embodiments of the invention, reference is made to the accompanying drawings in which it is demonstrated by way of illustration specific embodiments in which the invention may be practiced. It is to be understood that other embodiments may be used and structural changes can be made without departing from the scope of the present invention. It should be recognized that an IVR system is one of several customer interface technologies that can benefit from the present invention's call routing technologies. With the advancement of technology, other customer interfaces are available that ultimately place a customer in connection with a customer service agent, and thus such interfaces must also use call routing technologies to route inquiries to the call center operating most effectively. Such other customer interfaces include "live online help" available at some company websites or "call me" functions by which an online customer may indicate her wish to be called by a contact center representative. Both functions would use call routing technologies to route such customer inquires to the appropriate contact center.

These and other such service offerings could benefit from the advancement in the art described herein. Hence, in the present application, while reference is made to an "IVR" system, a "call routing system", and "customer calls" such terms should be interpreted expansively to include other customer interfaces that might communicate through other communication channels.

Figure 1:
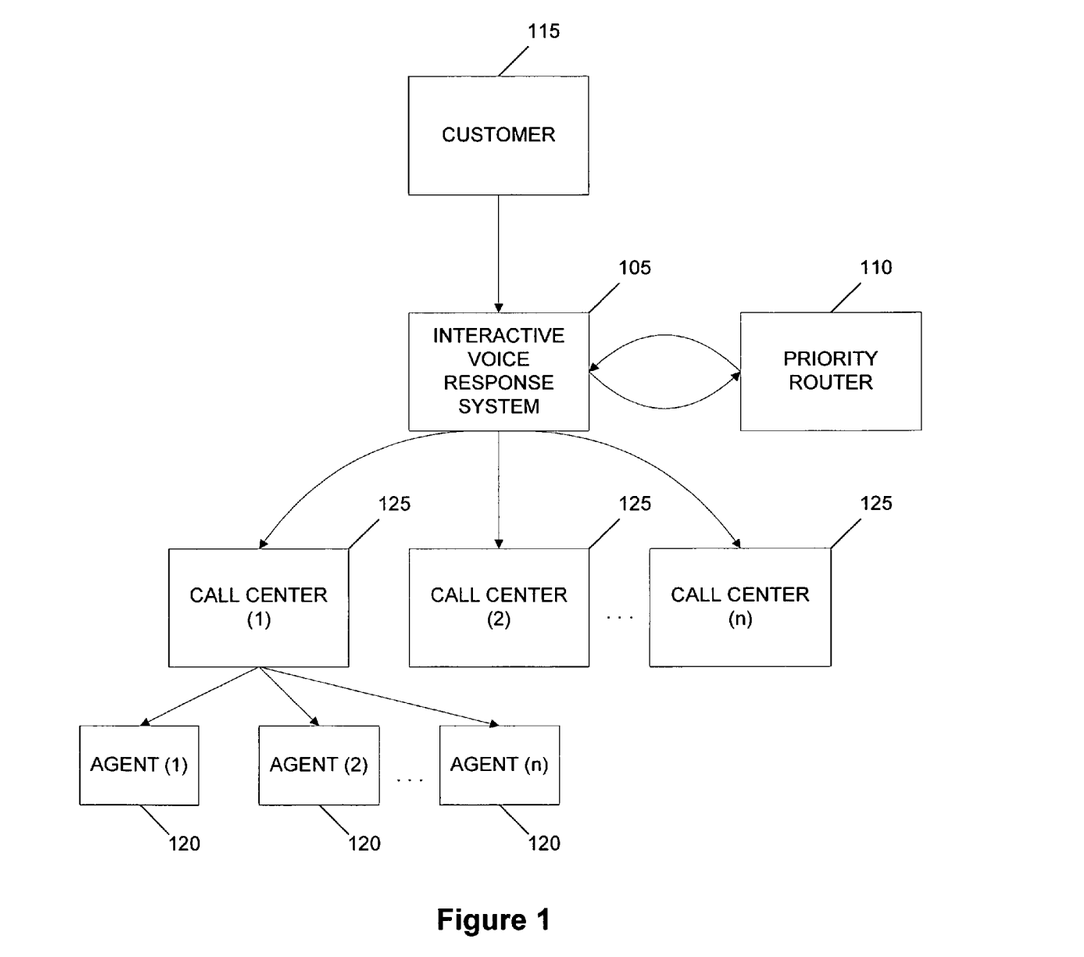
FIG. 1 is a block diagram of an IVR system employing a call routing module.

In one embodiment, the invention can be implemented as a separate routing module used in conjunction with a call routing system. FIG. 1 is exemplary of such a system in which the customer interface is an IVR system. The IVR system 105 queries the routing module 110 upon command from a customer 115 selecting the option (explicitly, implicitly, or as a result of certain processing) to speak with a live call center agent 120 at a call center 125 that services the IVR system 105. Communications between the IVR system 105, routing module 110, and call center 125 are accomplished over secure HTTP connections.

Figure 2:
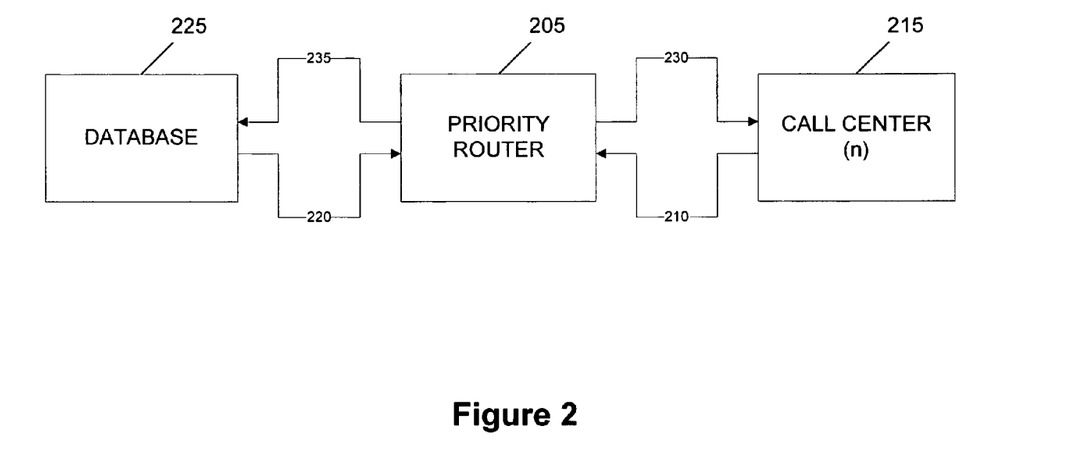
FIG. 2 is a diagram of a routing module at steady state.

FIG. 2 illustrates the operation of the routing module 205, introduced as reference 110 in FIG. 1, at "steady state" when no request for routing is being processed. At regular intervals, the routing module collects Automatic Call Distribution ("ACD") data 210 from a plurality of call centers 215, and additionally collects non-ACD data 220 stored in a database 225. This collection of ACD data 210 and non-ACD data 220 is performed by the routing module by polling the call center call routing/reporting platforms 230 and database 235 via secure HTTP. In an alternate embodiment, ACD data and non-ACD data are automatically sent to the routing module without initiation by the routing module. In another alternate embodiment, non-ACD data is only retrieved at times when it is updated in the system by the user of the routing module.

As considered in this disclosure, ACD data comprises real-time performance data for each call center. ACD data is obtainable from each call center through interfacing directly with the ACD system or through other real-time reporting software used by each call center. Some of the real-time performance metrics that can be obtained are:

Average Handle Time ("AHT") is the average total time to handle a call or contact and is generally measured in minutes. In some embodiments, this performance metric is calculated by a call center vendor's reporting system and directly supplied to the routing module upon query by the routing module. In other embodiments, this performance metric must be derived, and it consists of the sum of Average Talk Time for a call and Average Wrap-up Time after a call, both for a specified time period.

Average Speed to Answer ("ASA") is the average time estimate for a caller to get to a live call center agent and is generally measured in seconds. It is based on factors such as estimated wait time, number of calls in queue, number of available live agents, and average talk time. Generally, this metric is calculated by a call center's reporting software.

Service Level ("SL") is a calculated value based on some predetermined standard set for a specific call center. It is calculated by the call center reporting software and is measured as a percentage of compliance with the predetermined goal, such as answering all calls within a specific amount of time. For example, a service level of 85 percent would mean that 85 percent of the calls are answered within the predetermined amount of time.

Call Volume ("CV") is the total number of calls sent to each call center. This number is usually based on an interval. In most cases an interval is equal to 30 minutes. It is tracked by each call center's reporting software.

Besides these performance metrics, ACD data might include additional data types required for data normalization and call center screening.

Non-ACD data collected by the routing module is non-real-time performance data, subjective measurements, and other predefined target values. Such non-ACD data includes contractually mandated performance levels, cost per call resolution, and a vendor quality score. In the preferred embodiment, these non-ACD data include one or more of the following:

Cost per Resolution ("CpR") is a calculated metric determined by the system user and stored in the system database accessed by the routing module. CpR is the average cost incurred by the call center to provide a solution for the caller.

Quality Score ("QS") is a subjective measure of the call center or call center vendor and is assigned by the system user and stored in the IVR system database. The value is a number between 1 and 100.

Forecasted Number of Calls ("FNC") is the forecasted number of calls to be handled by either a specific vendor or call center for a given month. This metric might be further sub-divided by an interval time. Thus, the value can vary depending on where in a day or month the specific interval falls, and each day may have several different FNC values because such values correspond to different intervals within a specific day. The value is predetermined by the system user and stored in the system database.

Maximum Average Handle Time ("MaxAHT") is the maximum acceptable average handle time for a call with which a vendor or call center must comply. It is a predetermined value set by the system user and stored in the system database.

Maximum Average Speed to Answer ("MaxASA") is the maximum acceptable average time a call center or vendor may take to answer a call. It is a predetermined value set by the system user and stored in the system database.

Maximum Cost per Resolution ("MaxCpR") is the maximum acceptable cost per resolution a call center or vendor may incur to resolve a call. It is a predetermined value set by the system user and stored in the system database.

Figure 3:
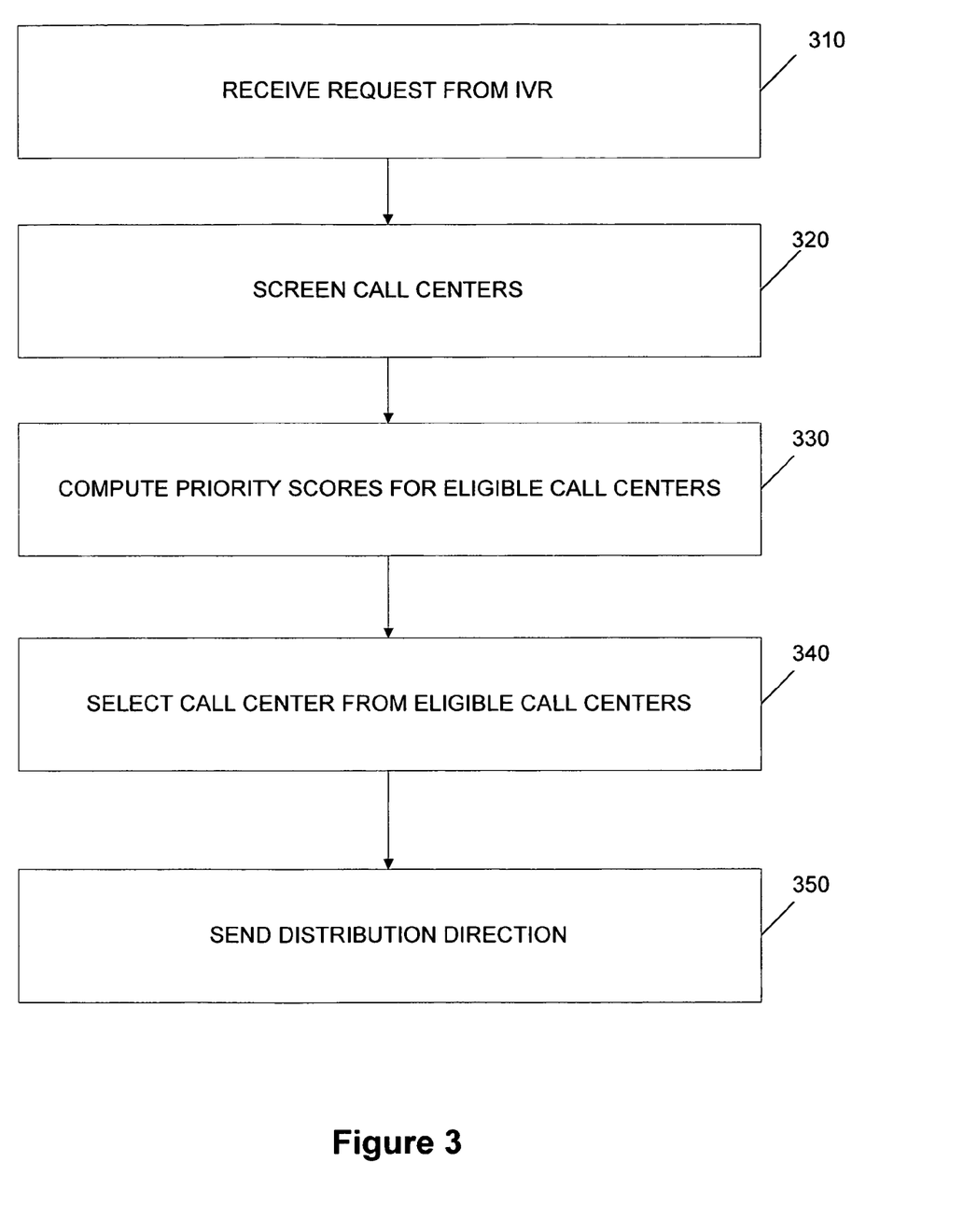
FIG. 3 is a flowchart of a routing module determining the designated call center.

Upon receipt of a routing request from the IVR system, the routing module evaluates the ACD and non-ACD data for each call center, determines the appropriate call center to which the call should be routed, and returns a routing direction to the IVR system. FIG. 3 illustrates the process by which the routing module designates the target call center. As disclosed an illustrated in FIG. 2, at regular intervals ACD data and non-ACD data for each call center are collected. Old information held is refreshed in the router module memory. The IVR sends a routing request to the routing module. As part of the routing request, the IVR identifies the type of call. The routing module receives the routing request 310 and proceeds to screen the available call centers 320. Screening is performed by comparing two criteria. First, the routing module determines whether each available call center can service the call type. After call centers are eliminated based on call type, the current ASA statistic for each remaining call center is compared with the pre-defined MaxASA. If the call center ASA value does not exceed the MaxASA value, the call center is eligible to receive the call and the call center's priority score is calculated. In an alternate embodiment, other real-time criteria might be used to determine call center eligibility. In another alternate embodiment, other criteria besides call type might not be consulted if a minority of call centers can service the call.

Figure 4:
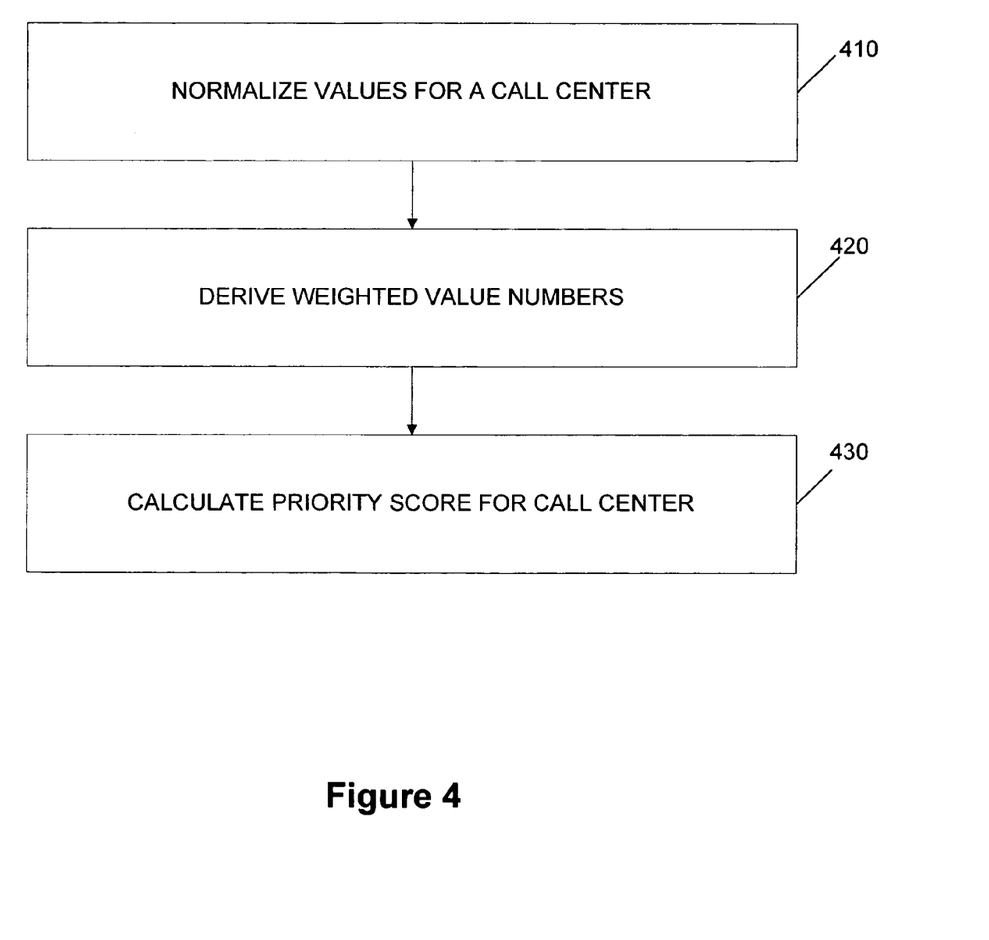
FIG. 4 is a flowchart of calculating a priority score for a call center.

Once call centers are screened, those eligible to handle the call are prioritized 330. FIG. 4 illustrates the prioritization calculation for an individual call center. For each call center algorithms normalize certain values 410 and multiplies each normalized value to determine a weighted value number 420 for each normalized value. These weighted value numbers for a call center are totaled 430 to obtain the priority score for a call center. In one embodiment normalized values are derived for the parameters Call Volume Tracking, Average Handle Time, Average Speed to Answer, and Cost per Resolution. Each of these normalized values are computed using a specific equation. To compute, the router module applies the values for each variable held in memory to obtain the normalized value.

Normalized Call Volume Tracking (NCVT) is computed with the following equation:

$$NCVT = \left[\frac{(NC/FNC)}{(DE/DM)}\right] \times 100$$

where

NC represents the actual number of calls handled by the vendor in the month;

FNC represents the forecasted number of call to be handled by the vendor in the month;

DE represents the number of days in the month that have elapsed; and

DM represents the number of days in the month.

Inputs to this equation that normalizes the Call Volume Tracking factor are NC, FNC, DE, and DM. NC is obtained from call center reporting data; FNC is user defined and stored as non-ACD data; DE is a system value derived from the system date; and DM is another system derived value.

Normalized Average Handling Time (NAHT) is computed with the following equation:

$$NAHT = [1 - (AHT/MaxAHT)] \times 100$$

where

AHT represents the real-time average handle time for the contact center; and

MaxAHT represents the user-defined maximum acceptable average handle time for the contact center.

Inputs to this equation that normalizes the Average Handling Time factor are AHT and MaxAHT. AHT is obtained from the call center reporting data; MaxAHT is user-defined and stored as non-ACD data.

Normalized Average Speed to Answer (NASA) is computed with the following equation:

$$NASA = [1 - (ASA/MaxASA)] \times 100$$

where

ASA represents the Average Speed to Answer a call for the contact center; and

MaxASA represents the user-defined maximum acceptable average speed to answer for the contact center.

Inputs to this equation that normalizes the Average Speed to Answer factor are ASA and MaxASA. ASA is obtained from the call center reporting data; MaxASA is user-defined and stored as non-ACD data.

Normalized Cost per Resolution (NCpR) is computed with the following equation:

$$NCpR = [1 - (CpR/MaxCpR)] \times 100$$

where

CpR represents the cost per call resolution incurred by the call center; and

MaxCpR represents the user-defined maximum acceptable cost per call resolution.

Inputs to this equation that normalizes the Cost per Resolution factor are CpR and MaxCpR. CpR is user-derived and is stored as non-ACD data; MaxASA is user-defined and also stored as non-ACD data.

Of course, variations in the above formulas or entirely different formulas may be used without departing from the scope and intent of the present invention.

Other factors considered in the priority calculation do not require a normalization calculation. These factors include SL and Quality Score, which are presented on scales of 1 to 100. In other embodiments other pre-normalized factors might be considered and applied as factors that do not require a normalization calculation.

Figure 5:
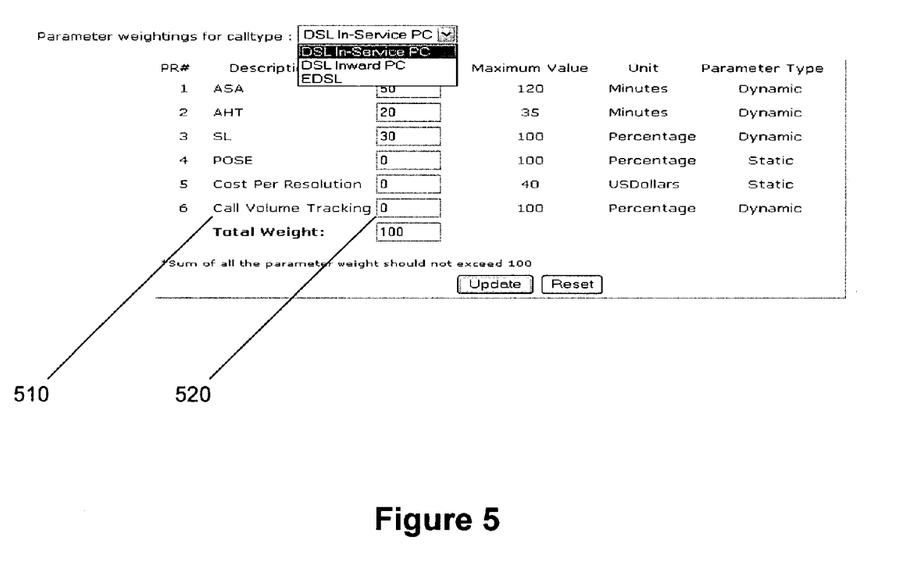
FIG. 5 illustrates a computer screen for manipulating and storing ACD and non-ACD weighting scores.

Priority weighting scores are assigned by the system user. FIG. 5 is an illustration of how the weighting of each factor is assigned. There the user identifies the factors that should be considered in the priority calculation 510. When a factor is selected the user enters a weighting score 520 between one and one hundred. All weighting scores for all factors together equal one hundred. Once entered, the user saves the weighting scores to the system database.

The routing module continues to calculate priority values for each eligible call center until the priority value for all eligible call centers has been calculated. Returning to FIG. 3, in one embodiment, the routing module compiles the priority values for all eligible call centers and then designates the call center with the highest priority score 340. The designated call center identification is then transmitted to the IVR 350. In an alternate embodiment, if an error occurs preventing connection of the call to the designated call center, the IVR can communicate with the router module to obtain an alternate call center. In another alternate embodiment, the router module can send both the designated call center and an alternate call center, thereby reducing the number of communications sent between the IVR and routing module.

In another alternate embodiment, the designation of the call center to handle the call is determined on a rolling basis. Where more than one call center is eligible to handle the call, the first call center for which a priority value is computed is by default the designated call center. After the priority value of the next eligible call center is computed, the value is compared to the value of the first call center, and the call center with the greater priority value is designated and held in memory. If the first call center looses the designation, it is then discarded from memory. The evaluation process continues in this manner through all eligible call centers. Thus in this alternate embodiment only the call center with highest priority value is transmitted to the IVR.

While the present detailed description describes one embodiment of the present invention used in conjunction with an IVR system, the present invention could be applied to other types of routing systems. It is to be understood that other embodiments may be utilized and structural changes can be made without departing from the scope of the present invention.

What is claimed is:

1. A method for determining to which call center a customer call preferably should be routed, comprising:
    receiving ACD data for a plurality of call centers;
    receiving non-ACD data, wherein the non-ACD data comprises at least cost data;

receiving a routing request for a customer call from a call routing system;

choosing a target call center from the plurality of call centers, wherein choosing is a function of a priority score of the target call center based on both the ACD data and the non-ACD data;

computing a priority score for each call center of the plurality of call centers, wherein computing a priority score for each call center comprises:

multiplying a normalized factor weighting score, for both ACD data and non-ACD data, with a corresponding normalized factor;

selecting the call center with the highest priority score; wherein the normalized factor comprises Call Volume Tracking; and wherein the normalized factor of Call Volume Tracking is calculated by the following equation:

$$NCVT = \left[\frac{(NC/FNC)}{(DE/DM)}\right] \times 100$$

where

NCVT represents the normalized call volume tracking result;

NO represents the actual number of calls handled by the vendor in the month;

FNC represents the forecasted number of calls to be handled by the vendor in the month;

DE represents the number of days in the month that have elapsed; and

DM represents the number of days in the month.

sending a routing response to the call routing system indicating the target call center.

2. The method of claim 1, wherein each call center of the plurality of call centers is selected for priority weighting based on the call type.

3. The method of claim 2, wherein each call center of the plurality of call centers is selected for priority weighting based on average speed to answer.

4. The method of claim 1, wherein receiving non-ACD data comprises:

prompting an automated process to send non-ACD data for a plurality of non-ACD data fields;

receiving via the automated process non-ACD data corresponding to at least one of the plurality of non-ACD data fields and a plurality of normalized factor weighting scores with a corresponding plurality of normalized factors; and saving the non-ACD data.

5. The method of claim 1, wherein receiving non-ACD data comprises:

presenting to a user a plurality of non-ACD data fields;

receiving from the user non-ACD data corresponding to at least one of the plurality of non-ACD data fields; and saving the non-ACD data.

6. The method of claim 4 or 5, wherein the plurality of non-ACD data fields are chosen from the group comprising cost per resolution, cost per minute, maximum Average Speed to Answer, maximum Average Handle Time, maximum Cost per Resolution, Forecasted Number of Calls for a vendor, and a plurality of normalized factor weighting scores.

7. The method of claim 1, wherein receiving ACD data comprises:

prompting an automated process to send ACD data for a plurality of ACD data fields;

receiving via the automated process ACD data corresponding to at least one of the plurality of ACD data fields; and saving the ACD data.

8. The method of claim 7, wherein the plurality of ACD data fields are chosen from the group comprising Number of Vendor Calls, Average Handle Time, and Average Speed to Answer.

9. The method of claim 1, wherein receiving the ACD data is repeated at a predetermined interval.

10. The method of claim 1, wherein receiving the non-ACD data is repeated at a predetermined interval.

11. A computer program embodied on a non-transitory computer readable medium and executable on a computer for determining to which call center a customer call preferably should be routed, comprising:

a code segment for receiving ACD data for a plurality of call centers;

a code segment for receiving non-ACD data, wherein the non-ACD data comprises at least cost data;

a code segment for receiving a routing request for the customer call from a call routing system;

a code segment for choosing a target call center from the plurality of call centers, wherein the step of choosing is a function of a priority score of the target call center based on both the ACD data and the non-ACD data; and a code segment for sending a routing response to the call routing system indicating the target call center;

wherein the code segment for choosing the target call center comprises:

a code segment for computing a priority score for each call center of the plurality of call centers, wherein the code segment for computing a priority score for each call center comprises:

a code segment for multiplying a normalized factor weighing score, for both ACD data and non-ACD data, with a corresponding normalized factor; and a code segment for selecting the call center with the highest priority score; wherein the normalized factor comprises Average Handle Time; and a code segment for adding together the product of all computations; and a code segment for selecting the call center with the highest priority score;

wherein the normalized factor comprises Average Handle Time; and wherein the normalized factor of Average Handle Time is calculated by the following equation:

$$NAHT = [1 - (AHT/MaxAHT)] \times 100$$

where

NAHT represents the normalized average handle time result;

AHT represents the real-time average handle time for the contact center; and

MaxAHT represents the user-defined maximum acceptable average handle time for the contact center.

12. The computer program of claim 11, wherein each call center of the plurality of call centers is selected for priority weighting based on call type.

13. The computer program of claim 12, wherein each call center of the plurality of call centers is selected for priority weighting based on average speed to answer.

14. The computer program of claim 11, wherein the code segment for receiving non-ACD data comprises:

a code segment for prompting an automated process to send non-ACD data for a plurality of non-ACD data fields;
a code segment for receiving via the automated process non-ACD data corresponding to at least one of the plurality of non-ACD data fields; and
a code segment for saving the non-ACD data.

15. The computer program of claim 11, wherein the code segment for receiving non-ACD data comprises:
a code segment for presenting to a user a plurality of non-ACD data fields;
a code segment for receiving from the user non-ACD data corresponding to at least one of the plurality of non-ACD data fields; and
a code segment for saving the non-ACD data.

16. The computer program of claim 14 or 15, wherein the plurality of non-ACD data fields are chosen from the group comprising cost per resolution, cost per minute, maximum Average Speed to Answer, maximum Average Handle Time, maximum Cost per Resolution, Forecasted Number of Calls for a vendor, and a plurality of normalized factor weighting scores.

17. The computer program of claim 11, wherein the code segment for receiving ACD data comprises:
a code segment for prompting an automated process to send ACD data for a plurality of ACD data fields;
a code segment for receiving via the automated process ACD data corresponding to at least one of the plurality of ACD data fields; and
a code segment for saving the ACD data.

18. The computer program of claim 17, wherein the plurality of ACD data fields are chosen from the group comprising Number of Vendor Calls, Average Handle Time, and Average Speed to Answer.

19. The computer program of claim 11, wherein receiving the ACD data is repeated at a predetermined interval.

20. The computer program of claim 11, wherein receiving the non-ACD data is repeated at a predetermined interval.

21. A system for determining to which call center a customer call preferably should be routed, comprising:
a receiving module for receiving ACD data for a plurality of call centers;
a receiving module for receiving non-ACD data, wherein the non-ACD data comprises at least cost data;
a request module for receiving a routing request for the customer call from a call routing system;
a decision module for choosing a target call center from the plurality of call centers, wherein the step of choosing is a function of a priority score of the target call center based on both the ACD data and the non-ACD data;
a response module for sending a routing response to the call routing system indicating the target call center;
wherein choosing the target call center comprises:
a computing module for computing a priority score for each call center of the plurality of call centers, wherein the computing module for computing a priority score for each call center comprises:
a computing module for multiplying a normalized factor weighting score, for both ACD data and non-ACD data, with a corresponding normalized factor; and
a computing module for selecting the call center with the highest priority score; wherein the normalized factor comprises Average Speed to Answer; and
a computing module for adding together the product of all computations; and
a computing module for selecting the call center with the highest priority score;
wherein the normalized factor comprises Average Speed to Answer; and
wherein the normalized factor of Average Speed to Answer is calculated by the following equation:

$$NASA = [1 - (ASA/MaxASA)] \times 100$$

where
NASA represents the Normalized Average Speed to Answer result;
NASA represents the average speed to answer for the contact center; and
MaxASA represents the user-defined maximum acceptable average speed to answer for the contact center.

22. The system of claim 21, wherein each call center of the plurality of call centers is selected for priority weighting based on call type.

23. The system of claim 22, wherein each call center of the plurality of call centers is selected for priority weighting based on average speed to answer.

24. The system of claim 21, wherein the receiving module for receiving non-ACD data comprises:
a presenting module for presenting to a user a plurality of non-ACD data fields;
a receiving module for receiving from the user non-ACD data corresponding to at least one of the plurality of non-ACD data fields; and
a saving module for saving the non-ACD data.

25. The system of claim 21, wherein the receiving module for receiving non-ACD data comprises:
a prompting module for prompting an automated process to send non-ACD data for a plurality of non-ACD data fields;
a receiving module for receiving via the automated process non-ACD data corresponding to at least one of the plurality of non-ACD data fields; and
a saving module for saving the non-ACD data.

26. The system of claim 24 or 25, wherein the plurality of non-ACD data fields are chosen from the group comprising cost per resolution, cost per minute, maximum Average Speed to Answer, maximum Average Handle Time, maximum Cost per Resolution, Forecasted Number of Calls for a vendor, and a plurality of normalized factor weighting scores.

27. The system of claim 21, wherein receiving ACD data comprises:
a prompting module for prompting an automated process to send ACD data for a plurality of ACD data fields;
a receiving module for receiving via the automated process ACD data corresponding to at least one of the plurality of ACD data fields; and
a saving module for saving the ACD data.

28. The system of claim 27, wherein the plurality of ACD data fields are chosen from the group comprising Number of Vendor Calls, Average Handle Time, and Average Speed to Answer.

29. The system of claim 21, wherein receiving the ACD data is repeated at a predetermined interval.

30. The system of claim 21, wherein receiving the non-ACD data is repeated at a predetermined interval.

31. A system for determining to which call center a customer call preferably should be routed, comprising:
means for receiving ACD data for a plurality of call centers;

means for receiving non-ACD data, wherein the non-ACD data comprises at least cost data;
means for receiving a routing request for the customer call from a call routing system;
means for choosing a target call center from the plurality of call centers, wherein the step of choosing is a function of a priority score of the target call center based on both the ACD data and the non-ACD data; and
means for sending a routing response to the call routing system indicating the target call center;
wherein choosing the target call center comprises:
means for computing a priority score for each call center of the plurality of call centers, wherein the means for computing a priority score for each call center comprises:
means for multiplying a normalized factor weighting score, for both ACD data and non-ACD data, with a corresponding normalized factor; and
means for selecting the call center with the highest priority score; wherein the normalized factor comprises Cost per Resolution;
means for adding together the product of all computations; and
means for selecting the call center with the highest priority score;
wherein the normalized factor comprises Cost per Resolution;
wherein the normalized factor of Cost per Resolution is calculated by the following equation:

$$NCpR = [1 - (CpR/MaxCpR)] \times 100$$

where
NCpR is the Normalized Cost per Resolution result;
CpR represents the cost per call resolution incurred by the call center; and
MaxCpR represents the user-defined maximum acceptable cost per call resolution.

32. The system of claim 31, wherein each call center of the plurality of call centers is selected for priority weighting based on the call type.

33. The system of claim 32, wherein each call center of the plurality of call centers is selected for priority weighting based average speed to answer.

34. The system of claim 31, wherein the means for receiving non-ACD data comprises:
means for presenting to a user a plurality of non-ACD data fields;
means for receiving from the user non-ACD data corresponding to at least one of the plurality of non-ACD data fields; and
means for saving the non-ACD data.

35. The system of claim 31, wherein the means for receiving non-ACD data comprises:
means for prompting an automated process to send non-ACD data for a plurality of non-ACD data fields;
means for receiving via the automated process non-ACD data corresponding to at least one of the plurality of non-ACD data fields; and
means for saving the non-ACD data.

36. The system of claim 34 or 35, wherein the plurality of non-ACD data fields are chosen from the group comprising cost per resolution, cost per minute, maximum Average Speed to Answer, maximum Average Handle Time, maximum Cost per Resolution, Forecasted Number of Calls for a vendor, and a plurality of normalized factor weighting scores.

37. The system of claim 31, wherein the means for receiving ACD data comprises:
means for prompting an automated process to send ACD data for a plurality of ACD data fields;
means for receiving via the automated process ACD data corresponding to at least one of the plurality of ACD data fields; and
means for saving the ACD data.

38. The system of claim 37, wherein the plurality of ACD data fields are chosen from the group comprising Number of Vendor Calls, Average Handle Time, and Average Speed to Answer.

39. The system of claim 31, wherein receiving the ACD data is repeated at a predetermined interval.

40. The system of claim 31, wherein receiving the non-ACD data is repeated at a predetermined interval.

* * * * *

UNITED STATES PATENT AND TRADEMARK OFFICE
CERTIFICATE OF CORRECTION

PATENT NO. : 7,970,118 B2  
APPLICATION NO. : 11/359719  
DATED : June 28, 2011  
INVENTOR(S) : James E. O'Dell, III Page 1 of 1

It is certified that error appears in the above-identified patent and that said Letters Patent is hereby corrected as shown below:

IN THE CLAIMS:

Claim 1, col. 7, line 13, after "normalized factor;", insert --and--.

Claim 1, col. 7, line 27, "NO" should read --NC--.

Claim 1, col. 7, line 33, delete "." after "the month".

Claim 11, col. 8, lines 40-45, delete
"a code segment for adding together the product of all
    computations; and
a code segment for selecting the call center with the
    highest priority score;
wherein the normalized factor comprises Average Handle
Time; and".

Signed and Sealed this  
Thirtieth Day of August, 2011

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,970,118 B2 | Page 1 of 1 |
| APPLICATION NO. | : 11/359719 | |
| DATED | : June 28, 2011 | |
| INVENTOR(S) | : James E. O'Dell, III | |

It is certified that error appears in the above-identified patent and that said Letters Patent is hereby corrected as shown below:

In the claims:
Claim 21, col. 9, line 66-67 delete "a computing module for adding together the product of all computations; and"

Signed and Sealed this
Eighteenth Day of October, 2011

David J. Kappos
*Director of the United States Patent and Trademark Office*